(12) United States Patent
Baig et al.

(10) Patent No.: US 8,747,788 B1
(45) Date of Patent: Jun. 10, 2014

(54) AFTERTREATMENT MODULE HAVING ANGLED CATALYST BANK

(71) Applicant: Caterpillar Inc., Peoria, IL (US)

(72) Inventors: Mirza Pervaiz Baig, Peoria, IL (US); Andrew Michael Denis, Peoria, IL (US); Raymond Bassilli Gerges, Peoria, IL (US); Raymond Upano Isada, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/750,885

(22) Filed: Jan. 25, 2013

(51) Int. Cl.
*B01D 53/94* (2006.01)
*F01N 3/10* (2006.01)
*F01N 3/28* (2006.01)

(52) U.S. Cl.
USPC ........ 423/212; 423/213.2; 422/168; 422/177; 422/180; 502/439; 502/527.23; 502/527.24; 60/299

(58) Field of Classification Search
USPC ............... 423/212, 213.2; 422/168, 177, 180; 502/439, 527.23, 527.24; 60/299
See application file for complete search history.

(56) References Cited

U.S. PATENT DOCUMENTS

| | | | |
|---|---|---|---|
| 3,086,839 A * | 4/1963 | Bloch | 423/212 |
| 3,237,399 A * | 3/1966 | Sheffer et al. | 60/289 |
| 3,247,665 A | 4/1966 | Behrens | |
| 3,796,546 A | 3/1974 | Poullot | |
| 3,801,287 A | 4/1974 | Scheitlin et al. | |
| 3,929,419 A * | 12/1975 | Chapman | 422/171 |
| 4,457,895 A | 7/1984 | Prigent | |
| 5,693,295 A * | 12/1997 | Foster | 422/180 |
| 5,996,339 A | 12/1999 | Gottberg et al. | |
| 6,214,305 B1 * | 4/2001 | van Harderveld et al. | 423/212 |
| 7,785,384 B2 | 8/2010 | Schramm et al. | |
| 8,071,037 B2 | 12/2011 | Harinath et al. | |
| 2005/0047982 A1* | 3/2005 | Berriman et al. | 423/235 |
| 2005/0232829 A1* | 10/2005 | Fuls | 422/180 |
| 2006/0185348 A1 | 8/2006 | Mayer et al. | |
| 2011/0146253 A1 | 6/2011 | Isada et al. | |
| 2012/0031699 A1 | 2/2012 | Gall et al. | |

* cited by examiner

*Primary Examiner* — Timothy Vanoy
(74) *Attorney, Agent, or Firm* — Finnegan, Henderson, Farabow, Garrett & Dunner LLP (57) ABSTRACT

An aftertreatment module for use with an engine is disclosed. The aftertreatment module may include a housing having an inlet configured to direct exhaust in a first flow direction into the aftertreatment module, and an outlet configured to direct exhaust in the first flow direction out of the aftertreatment module. The aftertreatment module may also include a catalyst bank separating the inlet from the outlet. The catalyst bank may have a face disposed at an oblique angle with respect to the first flow direction. The oblique angle may create an inlet passage extending from the inlet to the catalyst bank and having a decreasing cross-sectional area, and an outlet passage extending from the catalyst bank to the outlet and having an increasing cross-sectional area.

16 Claims, 5 Drawing Sheets

AFTERTREATMENT MODULE HAVING ANGLED CATALYST BANK

TECHNICAL FIELD

The present disclosure is directed to an aftertreatment module and, more particularly, to an aftertreatment module having an angled catalyst bank.

BACKGROUND

Internal combustion engines, including diesel engines, gasoline engines, gaseous fuel-powered engines, and other engines known in the art exhaust a complex mixture of air pollutants. These air pollutants are composed of gaseous compounds including, among other things, the oxides of nitrogen ($NO_X$). Due to increased awareness of the environment, exhaust emission standards have become more stringent, and the amount of $NO_X$ emitted to the atmosphere by an engine may be regulated depending on the type of engine, size of engine, and/or class of engine.

In order to comply with the regulation of $NO_X$, some engine manufacturers have implemented a strategy called selective catalytic reduction (SCR). SCR is an exhaust treatment process where a reductant, most commonly urea (($NH_2$)$_2$CO) or a water/urea solution, is selectively injected into the exhaust gas stream of an engine and adsorbed onto a downstream catalyst. The injected urea solution decomposes into ammonia ($NH_3$), which reacts with $NO_X$ in the exhaust gas to form water ($H_2O$) and diatomic nitrogen ($N_2$).

In some applications, multiple catalysts may be required for greater emissions control requirements. However, having multiple catalysts can increase exhaust backpressure and require significant amounts of space within the engine's exhaust system. In addition, it may be difficult to evenly distribute the exhaust and reductant mixture efficiently to each catalyst to maintain efficient reduction of $NO_X$. These problems may increase packaging difficulties of the exhaust system.

One attempt to improve packaging of an exhaust system with multiple SCR catalysts is described in U.S. Patent Application Publication No. 2011/0146253 ("the '253 publication") of Isada et al. that was published on Jun. 23, 2011. In particular, the '253 publication describes an aftertreatment module for use with an engine. The aftertreatment module includes a plurality of inlets and a plurality of outlets. The aftertreatment module also includes a plurality of exhaust treatment devices, including one or more banks of oxidation catalysts, a reductant dosing arrangement, and one or more banks of SCR catalysts. Many of these components serve multiple functions to utilize space within the aftertreatment module. For example, the bank of SCR catalysts is utilized to treat exhaust and as a wall of a restricted passage that causes exhaust to be evenly distributed across all of the SCR catalysts.

While the aftertreatment module of the '253 publication may help to improve packaging for exhaust systems with multiple catalysts, it may be less than optimal. Specifically, the aftertreatment module of the '253 publication may include unnecessary aftertreatment devices for certain applications, which may increase the overall packaging size of the aftertreatment module. A more compact aftertreatment module may be desirable. In addition, it may also be desirable to have the SCR catalysts positioned at a specific angle with respect to an exhaust flow of the inlet.

The aftertreatment module of the present disclosure solves one or more of the problems set forth above and/or other problems with existing technologies.

SUMMARY

One aspect of the present disclosure is directed to an aftertreatment module. The aftertreatment module may include a housing having an inlet configured to direct exhaust in a first flow direction into the aftertreatment module, and an outlet configured to direct exhaust in the first flow direction out of the aftertreatment module. The aftertreatment module may also include a catalyst bank separating the inlet from the outlet. The catalyst bank may have a face disposed at an oblique angle with respect to the first flow direction. The oblique angle may create an inlet passage extending from the inlet to the catalyst bank and having a decreasing cross-sectional area, and an outlet passage extending from the catalyst bank to the outlet and having an increasing cross-sectional area.

A second aspect of the present disclosure is directed to a method of treating exhaust. The method may include directing exhaust in a first flow direction into an aftertreatment module and dividing the exhaust into multiple flow streams. The method may also include redirecting the multiple flow streams through an oblique angle with respect to the first flow direction, and catalyzing the redirected exhaust. The method may further include rejoining the catalyzed exhaust into a single flow stream, and redirecting the rejoined exhaust back into the first flow direction out of the aftertreatment module.

DETAILED DESCRIPTION

Figure 1:
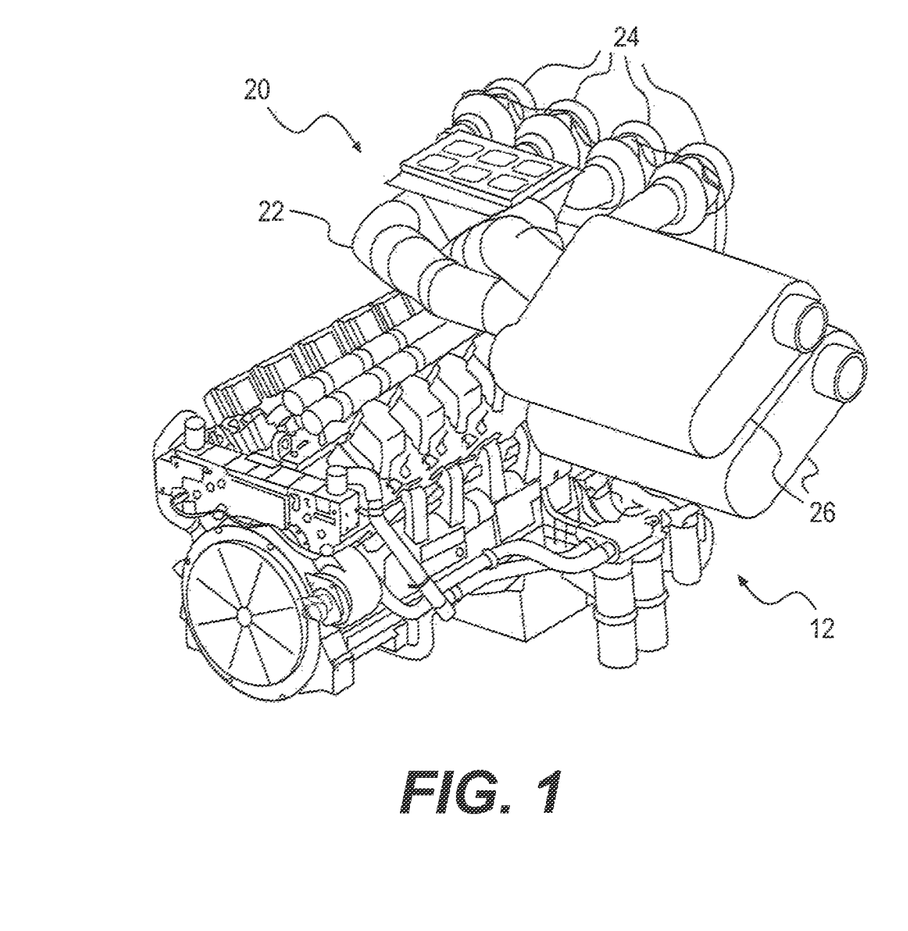
FIG. 1 is a pictorial illustration of an exemplary disclosed engine.

FIG. 1 illustrates an exemplary engine 12. Engine 12 may embody any large, multi-cylinder internal combustion engine that is diesel, gasoline, or gaseous-fueled. It is contemplated that engine 12 may be associated with a mobile machine (e.g., a locomotive) or a stationary system (e.g., a power producing system), which may include one or more additional components, such as a generator driven by a mechanical output of engine 12.

Engine 12 may include, among other things, an exhaust system 20 configured to treat and discharge byproducts of a combustion process occurring within cylinders of engine 12 to the atmosphere. Exhaust system 20 may include one or more turbochargers 24 driven by exhaust exiting the cylinders, one or more exhaust passages 22 that transport exhaust away from turbochargers 24, and one or more aftertreatment modules 26 connected to receive and treat exhaust from exhaust passages 22 after flowing through turbochargers 24.

Aftertreatment module 26 may treat, condition, and/or otherwise reduce constituents of the exhaust exiting the cylinders of engine 12 before the exhaust is discharged to the atmosphere.

In the illustrated embodiment, engine 12 includes sixteen cylinders arranged in two separate banks ("V-type" configuration), although any other suitable configuration may alternatively be utilized. Engine 12 may also be equipped with four turbochargers 24 located generally at one end of engine 12, and two aftertreatment modules 26. In this embodiment, two turbochargers 24 and one aftertreatment module 26 may be associated with each bank of cylinders. It is contemplated that, in other embodiments, engine 12 may include any number of cylinders, turbochargers 24, and aftertreatment modules 26, as desired.

Figure 2:
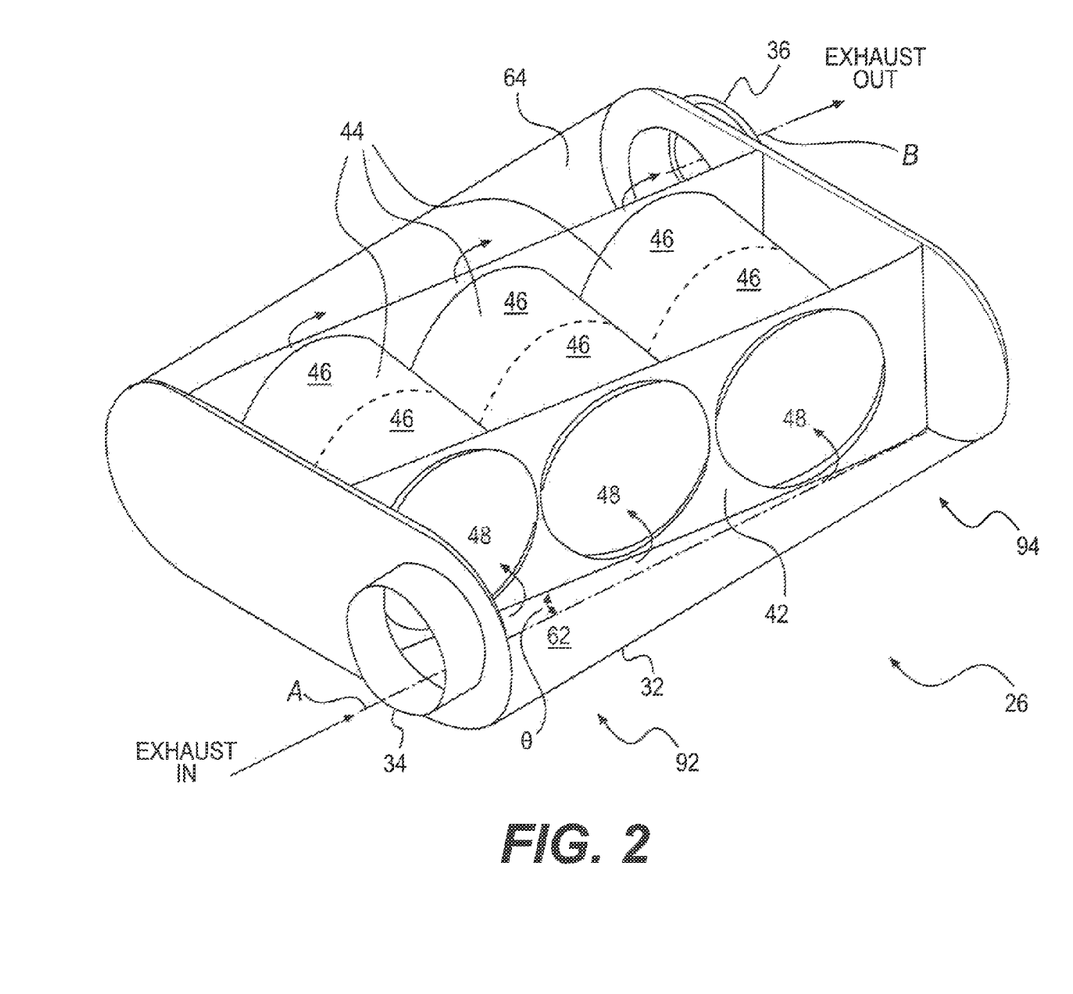
FIG. 2 is a pictorial illustration of an exemplary disclosed aftertreatment module that may be utilized in conjunction with the engine of FIG. 1.

As shown in FIG. 2, each aftertreatment module 26 may include a generally box-like housing 32. Housing 32 may be fabricated from, for example, welded stainless steel. Housing 32 may include an inlet 34 and an outlet 36, which may be located at opposite ends of housing 32 such that flows of exhaust may enter and exit housing 32 in substantially the same direction. Inlet 34 and outlet 36, in this embodiment, may be positioned offset and substantially parallel with respect to one another. More specifically, a center axis A of inlet 34 and a center axis B of outlet 36 may be offset and substantially parallel. Although only one inlet 34 and one outlet 36 are shown in the disclosed embodiment, it is contemplated that aftertreatment module 26 may include more than one inlet 34 and/or more than one outlet 36. Additionally, inlet 34 may be operatively connected to exhaust passage 22 (referring to FIG. 1).

Aftertreatment module 26 may house a plurality of exhaust treatment devices. For example, aftertreatment module 26 may house one or more catalyst banks 42 that separate inlet 34 from outlet 36. Catalyst banks 42 may include any type of catalyst known to the art, such as selective catalytic reduction (SCR), diesel oxidation catalysts (DOC), diesel particulate filters (DPF), ammonia oxidation catalysts (AMOX), etc. Catalyst bank 42 may include any number of catalysts or any combination of catalysts, as desired.

Catalyst bank 42 may include a plurality of sleeves 44 disposed in parallel with each other, and one or more catalyst bricks 46 disposed within each sleeve 44. Sleeves 44 may be co-mounted within a common support structure and spaced apart by a predetermined distance that allows enough space between sleeves 44 to avoid restricting exhaust flow. The common support structure may be mounted to housing 32 and be fabricated from a material similar to that of housing 32. In the embodiment shown in FIG. 2, catalyst bank 42 includes three sleeves 44 with two catalyst bricks 46 arranged in series within each sleeve 44.

Each catalyst brick 46 may be substantially identical in shape, size, and composition. It is contemplated, however, that shape, size, and/or composition may vary dependent on the application of aftertreatment module 26. It is also contemplated that an axial space may exist between catalyst bricks 46 within each sleeve 44, if desired, to promote exhaust distribution and sound attenuation. In one embodiment, each catalyst brick 46 may include a generally cylindrical substrate fabricated from or otherwise coated with a ceramic material such as titanium oxide; a base metal oxide such as vanadium and tungsten; zeolites; and/or a precious metal. With this composition, decomposed reductant entrained within the exhaust flowing through exhaust passage 22 may be adsorbed onto the surface and/or absorbed within each catalyst brick 46, where the reductant may react with NOx (NO and $NO_2$) in the exhaust gas to form water ($H_2O$) and diatomic nitrogen ($N_2$). In this embodiment, each catalyst brick 46 may be considered an SCR brick.

In the disclosed embodiment, catalyst bank 42 may have a face disposed at a predetermined oblique angle with respect to a direction of the exhaust flowing through inlet 34 (i.e., inlet flow). More specifically, faces 48 of catalyst bricks 46 may be positioned at an oblique angle θ relative to center axis A of inlet 34. Each face 48 associated with each catalyst brick 46 may be positioned at substantially the same angle. In the disclosed embodiment, angle θ may range between about 10°-14°. In one example, θ is about 12°. By positioning catalyst bank 42 at this specific angular relationship with respect to the inlet flow, exhaust may be distributed substantially equally across all faces 48 of catalyst bricks 46, while minimizing backpressure within aftertreatment module 26. Angles outside this particular angle range may result in an increased backpressure of aftertreatment module 26 and may also increase an overall packaging size of aftertreatment module 26.

This specific angular relationship between the inlet flow and bank of catalyst 42 may also create inlet and outlet passages 62, 64 that vary in cross-sectional area from a first end 92 of aftertreatment module 26 to a second end 94 of aftertreatment module 26. For instance, a cross-sectional area of inlet passage 62 may be larger adjacent to first end 92 relative to a cross-sectional area of inlet passage 62 adjacent to second end 94. Forcing exhaust to flow through a decreasing cross-sectional area of inlet passage 62 may increase the pressure adjacent second end 94. The increased pressure adjacent second end 94 may help direct exhaust from inlet passage 62 to enter sleeves 44 located adjacent second end 94. Additionally, the increased pressure adjacent second end 94 may force exhaust in inlet passage 62 to enter sleeves 44 located closer to first end 92. As a result, the decreasing cross-sectional area of inlet passage 62 may distribute exhaust substantially equally to all catalyst bricks 46. Outlet passage 64, on the other hand, may gradually increase its cross-sectional area from first end 92 to second end 94. Increasing the cross-sectional area of outlet passage 64 may help decrease pressure adjacent second end 94 at outlet 36. Reducing the pressure near outlet 36 in this manner may help drive exhaust in an increasing velocity through catalyst bricks 46 located adjacent second end 94 and out of aftertreatment module 26. As a result, the increasing cross-sectional area of outlet passage 64 may reduce significant restrictions in exhaust flow and therefore, reduce the overall backpressure in exhaust system 20.

Figure 3:
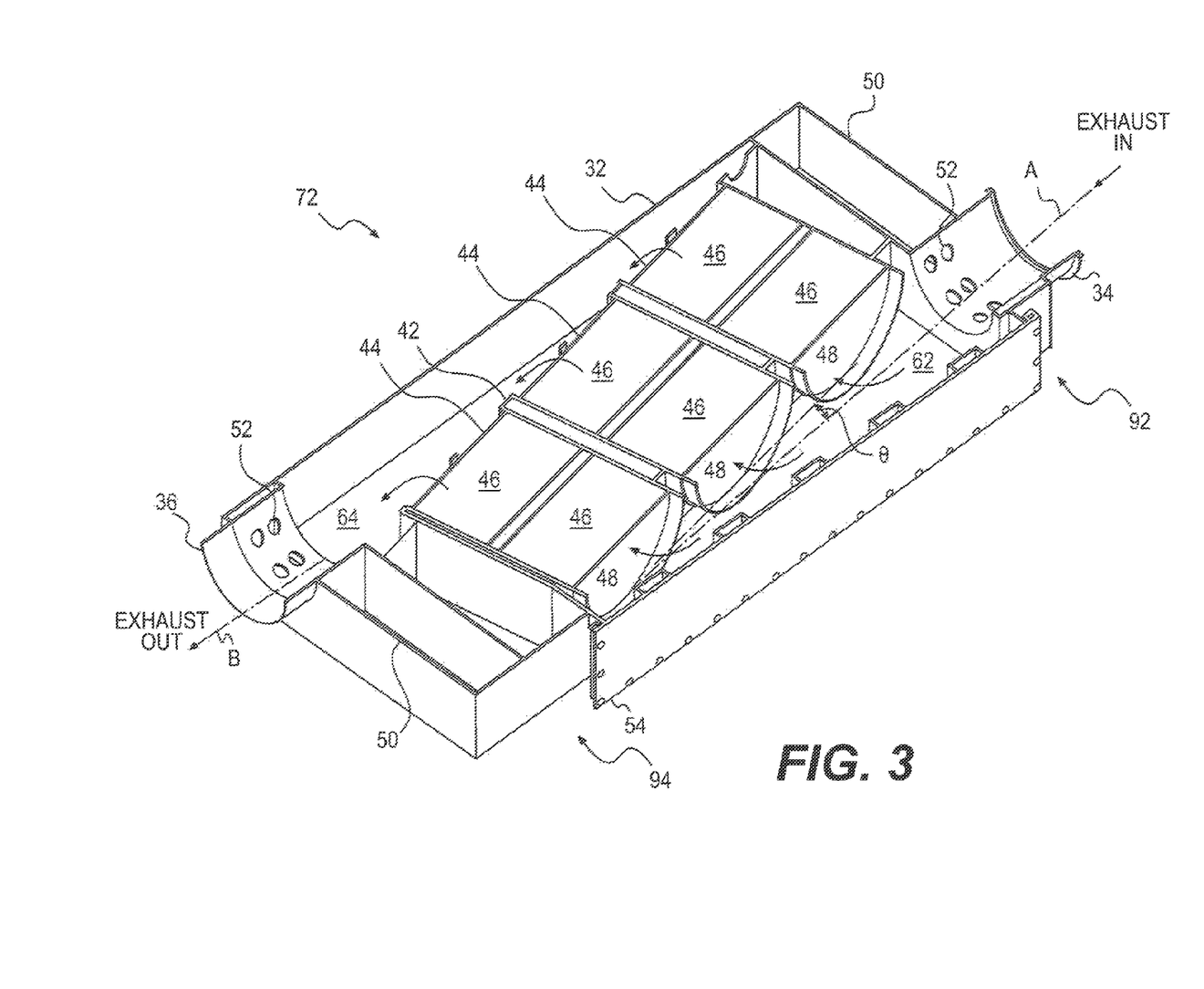
FIG. 3 is a cut-away view illustration of an alternative embodiment of the disclosed aftertreatment module that may be utilized in conjunction with the engine of FIG. 1.

FIG. 3 illustrates an alternative aftertreatment module 72. Similar to aftertreatment module 26 of FIG. 2, aftertreatment module 72 of FIG. 3 may include housing 32, inlet 34, outlet 36, catalyst bank 42, sleeves 44, catalyst bricks 46, and passages 62, 64. Exhaust may flow into aftertreatment module 72, through catalyst bank 42, and out of aftertreatment module 72 in substantially the same manner as the embodiment shown in FIG. 2. However, in contrast to aftertreatment module 26, aftertreatment module 72 may also include one or more attenuation chambers 50 located proximal to inlet 34 and/or outlet 36. Inlet 34 and outlet 36 may contain a plurality of holes 52 that allow fluid communication between inlet 34 and/or outlet 36 and attenuation chambers 50. Attenuation chambers 50 may be configured to promote sound attenuation, thereby reducing an overall noise level of the disclosed system. In addition, aftertreatment module 72 may include one or more access panels 54 located at strategic locations on housing 32 to provide service access to internal components of aftertreatment module 72.

Figure 4:
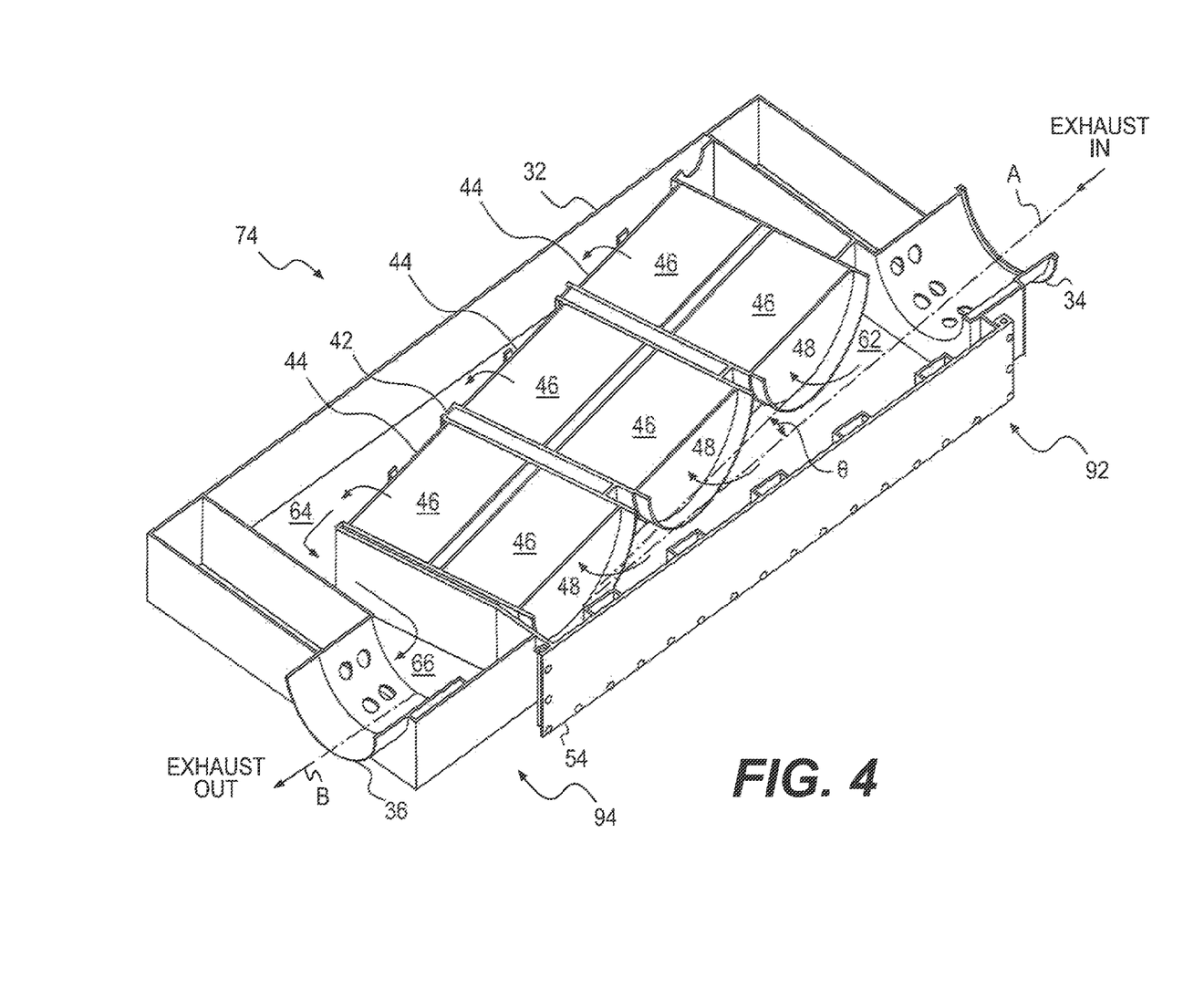
FIG. 4 is a cut-away view illustration of another alternative embodiment of the disclosed aftertreatment module that may be utilized in conjunction with the engine of FIG. 1.

FIG. 4 illustrates another alternative aftertreatment module 74. Similar to aftertreatment module 72 of FIG. 3, aftertreatment module 74 of FIG. 4 may include housing 32, inlet 34, outlet 36, catalyst bank 42, sleeves 44, catalyst bricks 46, access panel 54, passages 62, 64, and attenuation chambers 50. However, in contrast to aftertreatment module 72, inlet 34 and outlet 36 of aftertreatment module 74 may be coaxially aligned. More specifically, center axis A and center axis B (shown in FIG. 4) may be coaxially aligned with one another. Exhaust may flow into aftertreatment module 26 and through catalyst bank 42 in substantially the same manner as the embodiment shown in FIG. 3. However, after exiting catalyst bank 42, exhaust from outlet passage 64 may be redirected through an additional passage 66 located at second end 94 before exiting via outlet 36. Exhaust may flow through passage 66 in a direction substantially perpendicular to the direction of exhaust flowing through inlet 34 and outlet 36.

Figure 5:
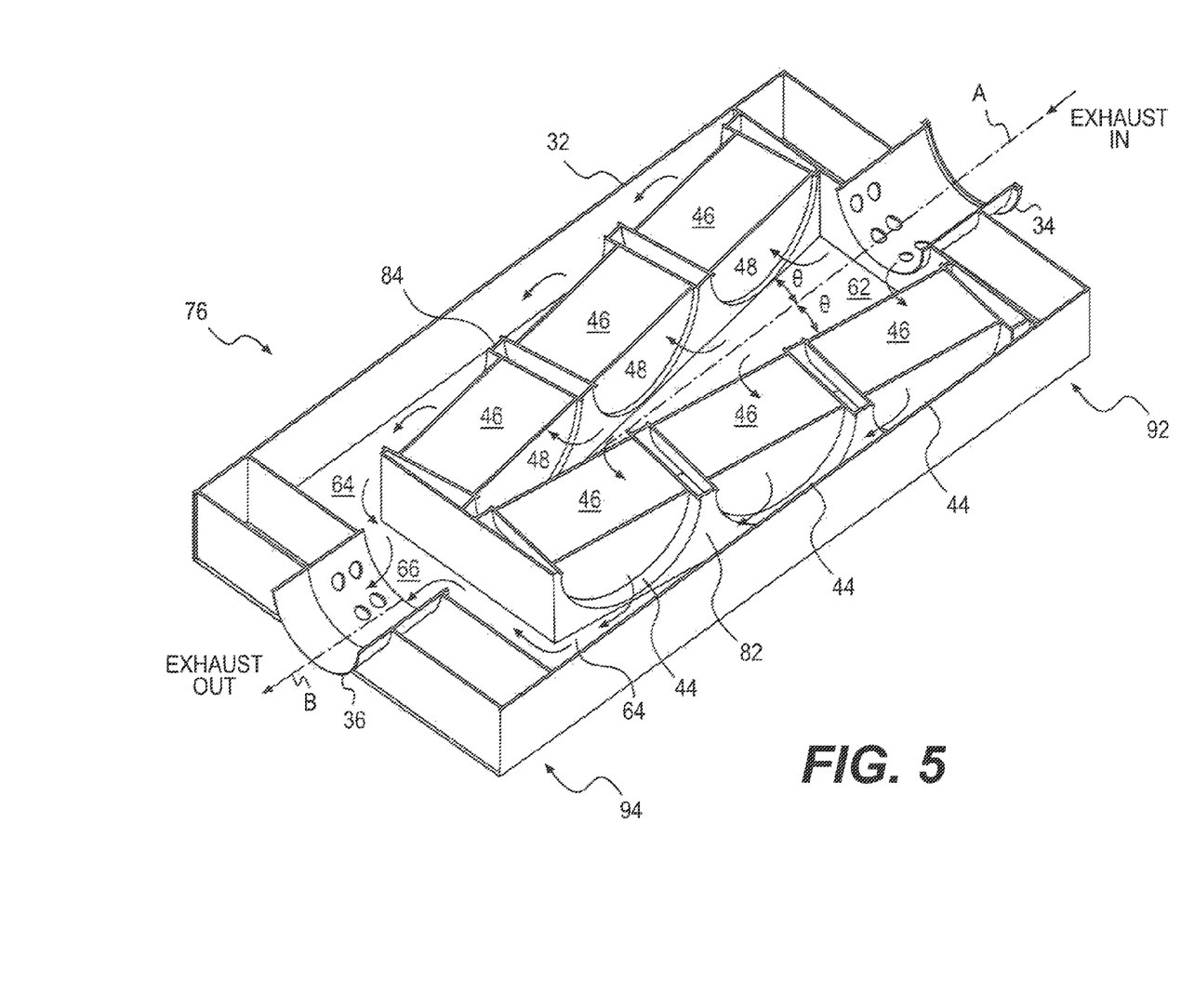
FIG. 5 is a cut-away view illustration of yet another alternative embodiment of the disclosed aftertreatment module that may be utilized in conjunction with the engine of FIG. 1.

FIG. 5 illustrates yet another alternative aftertreatment module 76. Similar to aftertreatment module 74 of FIG. 4, aftertreatment module 76 of FIG. 5 may include housing 32, inlet 34, outlet 36, catalyst bank 42, sleeves 44, catalyst bricks 46, passages 62, 64, 66, and attenuation chambers 50. In the embodiment of FIG. 5, however, aftertreatment module 76 may include first and second catalyst banks 82, 84, each including a plurality of catalyst bricks 46 arranged in parallel relative to each other. Each face 48 of the plurality of catalyst bricks 46 may be positioned at substantially the same angle θ with respect to the inlet flow. It is contemplated that, in this embodiment, exhaust may flow through each bank 82, 84 in substantially the same manner as the embodiment shown in FIG. 4. It is also contemplated that, center axis A of inlet 34 and center axis B of outlet 36 may be coaxially aligned and centered within housing 32, such that aftertreatment module 26 may be substantially symmetrical about center axis A and center axis B. Together, banks 82, 84 may form a general V-shape pointing toward outlet 36. In this example, FIG. 5 shows each of first and second banks 82, 84 including three SCR catalyst bricks 46 (a total of six SCR catalyst bricks 46). It is contemplated, however, that any number of catalyst banks 42 including any number of catalyst bricks 46 arranged in series or parallel may be utilized within aftertreatment module 26, as desired. Additionally, this embodiment may include two outlet passages 64, which may receive exhaust exiting catalyst bricks 46 of banks 82, 84. The exhaust from outlet passages 64 may then be rejoined in passage 66 prior to exiting aftertreatment module 26 through outlet 36.

INDUSTRIAL APPLICABILITY

The aftertreatment modules of the present disclosure may be applicable to any engine configuration requiring exhaust constituent conditioning, where exhaust distribution, backpressure, and space requirements are important issues. The disclosed aftertreatment modules may improve packaging by efficiently using available space for constituent reduction, while still providing an even distribution of exhaust flow and reductant across the catalysts. In addition, the disclosed aftertreatment modules may decrease the overall backpressure of the exhaust system. Operation of engine 12 will now be described.

Referring to FIG. 1, pressurized air or a mixture of fuel and air may be forced into the cylinders of engine 12 by turbochargers 24 for subsequent combustion. The fuel and air mixture may be combusted by engine 12 to produce a mechanical rotation that drives one or more devices (e.g. a generator) and to produce an exhaust flow of hot gases. The exhaust flow may contain a complex mixture of air pollutants, which can include, among other things, the oxides of nitrogen ($NO_x$). The exhaust may be directed through turbochargers 24 and exhaust passages 22 into aftertreatment module 26.

Referring to FIG. 2, exhaust may flow from exhaust passages 22 into aftertreatment module 26 via inlet 34. In some embodiments, a reductant may be injected into the exhaust flow at or upstream of inlet 34. Exhaust passing through inlet 34 may be divided into multiple flow streams and then be redirected through catalyst bank 42 at angle θ with respect to the inlet flow. As described above, because of the decreasing cross-sectional area of inlet passage 62, the exhaust may then be forced through sleeves 44 in a substantially uniform manner. As exhaust passed through sleeves 44, exhaust may be catalyzed in sequential stages. First, as the exhaust passes through a first set of catalyst bricks 46 within sleeves 44, NOx may react with the reductant and be reduced to water and diatomic nitrogen. Then, the exhaust may enter a second set of catalyst bricks 46, where the exhaust may again undergo a similar catalyzing process. It is contemplated, however, that, in some applications, the second catalyzing process may be substantially different from the first catalyzing process. The catalyzed exhaust may then exit the second set of catalyst bricks 46 and be rejoined into a single flow stream at outlet passage 64, where the rejoined exhaust may be immediately redirected to exit housing 32 through outlet 36. Exhaust passing through outlet 36 may flow in substantially the same direction as exhaust passed through inlet 34.

Referring to FIG. 3, exhaust may flow into aftertreatment module 72, through catalyst bank 42, and out of aftertreatment module 72 in substantially the same manner as described above with regard to aftertreatment module 26. However, in aftertreatment module 72, as the exhaust and reductant mixture passes through inlet 34, sound associated with the flow may reverberate in attenuation chamber 50 and dissipate. Then again, prior to exiting housing 32 through outlet 36, sound associated with the flow may reverberate in a second attenuation chamber 50 and dissipate.

Referring to FIG. 4, exhaust may flow into aftertreatment module 74 and through catalyst bank 42 in substantially the same manner as described above with regard to aftertreatment module 26. However, in aftertreatment module 74, upon exiting catalyst bank 42, catalyzed exhaust flowing through outlet passage 64 may be redirected in a substantially perpendicular direction through passage 66 prior to reaching outlet 36. Then, upon reaching outlet 36, the catalyzed exhaust may again be redirected back to substantially the same direction as exhaust passed through inlet 34. Redirecting flow through passage 66 may be necessary in some applications to adapt to different plumbing configurations, for example, when inlet 34 and outlet 36 are coaxially aligned.

Referring to FIG. 5, exhaust may flow into aftertreatment module 76 in substantially the same manner as described above with regard to aftertreatment module 26. However, in aftertreatment module 76, exhaust passing through inlet 34 may be divided into two substantially equal flow streams, which are then redirected towards first and second catalyst banks 82, 84 at angle θ with respect to the inlet flow. Exhaust in each of the two flow streams may again be divided into multiple flow streams at banks 82, 84. As described above, because of the decreasing cross-sectional area of inlet passage 62, the exhaust may flow through catalyst bricks 46 of banks 82, 84 in a substantially uniform manner. Then, after exiting catalyst bricks 46, the catalyzed exhaust may be rejoined back into two separate flow streams at first and second outlet passages 64. The two separate flow streams may be redirected in a substantially perpendicular direction and rejoined into a single flow stream within passage 66. Then, upon reaching outlet 36, the rejoined exhaust may again be redirected back to substantially the same direction as exhaust passed through inlet 34.

Aftertreatment module 26 may promote even exhaust distribution and sufficient reductant decomposition, while maintaining relatively low backpressure. For example, the specific angular relationship between the inlet flow and catalyst bank 42 may result in a decreasing cross-sectional area of inlet passage 62 and an increasing cross-sectional area of outlet passage 64. The decreasing cross-sectional area of outlet passage 62 may cause exhaust to be distributed amongst catalyst bricks 46 in a substantially uniform manner, while the increasing cross-sectional area of outlet passage 64 may force exhaust through catalyst bricks 46 in an increased velocity. Aftertreatment module 26 may also efficiently utilize space available within housing 32 to provide a compact aftertreatment system, while still achieving the required exhaust constituent conditioning.

It will be apparent to those skilled in the art that various modifications and variations can be made to the aftertreatment module of the present disclosure without departing from the scope of the disclosure. Other embodiments will be apparent to those skilled in the art from consideration of the specification and practice of the system and module disclosed herein. It is intended that the specification and examples be considered as exemplary only, with a true scope of the disclosure being indicated by the following claims and their equivalent.

What is claimed is:

1. An aftertreatment module, comprising:
a housing including:
an inlet configured to direct exhaust in a first flow direction into the aftertreatment module; and
an outlet configured to direct exhaust in the first flow direction out of the aftertreatment module;
at least one attenuation chamber located proximal to at least one of the inlet or the outlet; and
a catalyst bank separating the inlet and the outlet, the catalyst bank having a face disposed at an oblique angle with respect to the first flow direction,
wherein the angle creates:
an inlet passage extending from the inlet to the catalyst bank and having a decreasing cross-sectional area; and
an outlet passage extending from the catalyst bank to the outlet and having an increasing cross-sectional area, and
wherein the catalyst bank includes:
a plurality of sleeves disposed in parallel with each other; and
a plurality of catalyst bricks disposed within each of the plurality of sleeves.

2. The aftertreatment module of claim 1, wherein the angle is about 10°-14°.

3. The aftertreatment module of claim 1, wherein:
the plurality of sleeves includes three sleeves; and
the plurality of catalyst bricks includes two catalyst bricks.

4. The aftertreatment module of claim 1, wherein each of the plurality of catalyst bricks has a face disposed at an angle of about 10°-14° with respect to the first flow direction.

5. The aftertreatment module of claim 1, wherein a center axis of the inlet is offset from and substantially parallel with a center axis of the outlet.

6. The aftertreatment module of claim 1, wherein a center axis of the inlet is coaxially aligned with a center axis of the outlet.

7. The aftertreatment module of claim 6, wherein the housing further includes a passage configured to receive exhaust from the catalyst bank and redirect the exhaust in a second flow direction that is substantially perpendicular to the first flow direction before reaching the outlet.

8. The aftertreatment module of claim 1, wherein:
the catalyst bank is a first catalyst bank; and
the aftertreatment module further includes a second catalyst bank,
wherein the first and second catalyst banks form a general V-shape pointing toward a center axis of the outlet.

9. The aftertreatment module of claim 8, wherein the aftertreatment module is substantially symmetrical about the center axis of the outlet.

10. A method of treating exhaust, comprising:
directing exhaust in a first flow direction into an aftertreatment module;
dividing the exhaust into multiple flow streams;
redirecting the multiple flow streams through an oblique angle with respect to the first flow direction;
catalyzing the redirected exhaust;
rejoining the catalyzed exhaust into a single flow stream;
redirecting the single flow stream back into the first flow direction out of the aftertreatment module; and
redirecting the single flow stream in a second flow direction that is substantially perpendicular to the first flow direction after catalyzing the exhaust and before the single flow stream exits the aftertreatment module.

11. The method of claim 10, wherein catalyzing the exhaust includes catalyzing the exhaust in sequential stages.

12. The method of claim 10, wherein dividing the exhaust includes dividing the exhaust into two substantially equal flow streams, and further dividing each of the two flow streams into multiple flow streams.

13. An aftertreatment module, comprising:
a housing including:
an inlet configured to direct exhaust in a first flow direction into the aftertreatment module;
a passage configured to redirect the exhaust in a second flow direction that is substantially perpendicular to the first flow direction; and
an outlet configured to receive the exhaust from the passage and redirect the exhaust back to the first flow direction out of the aftertreatment module; and
a catalyst bank separating the inlet and the outlet, the catalyst bank including:
a plurality of sleeves disposed in parallel with each other;
a plurality of catalyst bricks disposed within each of the plurality of sleeves; and
a face disposed at an angle of about 10°-14° with respect to the first flow direction,
wherein the catalyst bank is a first catalyst bank, and the aftertreatment module further includes a second catalyst bank, the first and second catalyst banks forming a general V-shape pointing toward a center axis of the outlet.

14. The aftertreatment module of claim 13, further including at least one attenuation chamber located proximal to at least one of the inlet or the outlet.

15. The aftertreatment module of claim 13, further including:
an inlet passage extending from the inlet to the catalyst bank and having a decreasing cross-sectional area; and
an outlet passage extending from the catalyst bank to the outlet and having an increasing cross-sectional area.

16. The aftertreatment module of claim 13, wherein a center axis of the inlet is coaxially aligned with a center axis of the outlet.

\* \* \* \* \*